/ 100

United States Patent
Singh et al.

(10) Patent No.: US 10,231,188 B1
(45) Date of Patent: Mar. 12, 2019

(54) DYNAMIC UPLINK TRANSMIT POWER CONTROL

(71) Applicant: Sprint Spectrum LP, Overland Park, KS (US)

(72) Inventors: Jasinder Singh, Olathe, KS (US); Siddharth Oroskar, Overland Park, KS (US); Chunmei Liu, Great Falls, VA (US); Krishna Sitaram, Chantilly, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/592,570

(22) Filed: May 11, 2017

(51) Int. Cl.
*H04W 36/00* (2009.01)
*H04W 52/14* (2009.01)
*H04W 24/10* (2009.01)
*H04L 12/26* (2006.01)
*H04W 84/04* (2009.01)

(52) U.S. Cl.
CPC .......... *H04W 52/146* (2013.01); *H04L 43/16* (2013.01); *H04W 24/10* (2013.01); *H04W 84/042* (2013.01)

(58) Field of Classification Search
CPC ........... H04W 72/0413; H04W 52/146; H04W 84/045; H04W 52/243; H04W 52/244; H04W 36/30; H04W 52/241; H04W 52/245; H04W 84/042
USPC ................................ 455/443, 444, 436, 13.4
See application file for complete search history.

(56) References Cited

U.S. PATENT DOCUMENTS

| | | | |
|---|---|---|---|
| 9,078,220 B2 | 7/2015 | Makhlouf et al. | |
| 2014/0105040 A1* | 4/2014 | Baker | H04W 52/367 370/252 |
| 2016/0309374 A1* | 10/2016 | Shu | H04W 36/0022 |

* cited by examiner

*Primary Examiner* — Tu X Nguyen

(57) ABSTRACT

Controlling the uplink transmission power includes dynamically activating and deactivating a high-power transmission mode of the wireless devices in response to changes in a network topology, such as presence or absence of different types of access nodes, and signal level measurements of reference signals transmitted from said different types of access nodes. Such dynamic control of the uplink transmission power in real time minimizes interference that may be caused to uplink transmissions of other wireless devices in the network, and mitigates unnecessary power consumption for wireless devices capable of utilizing the high-power mode.

15 Claims, 11 Drawing Sheets

DYNAMIC UPLINK TRANSMIT POWER CONTROL

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

|  | Power Class 1 Wireless Device | | Power Class 2 Wireless Device | | Power Class 3 Wireless Device | | Power Class 4 Wireless Device | |
| --- | --- | --- | --- | --- | --- | --- | --- | --- |
| Operating Band | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices can be configured with a maximum allowable transmit power level of +23 dBm for frequency bands I-III with a nominal power tolerance of ±2 dB (e.g., for E-UTRA bands). High-power class wireless devices are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Because high-power class wireless devices are capable of transmitting at a maximum allowable transmit power that is higher than lower-power class wireless devices, there are potential uplink (UL) interference concerns when high-power class wireless devices are deployed in areas having an access node density designed for low-power wireless devices. Namely, power mismatches between high-power class wireless devices and low-power wireless devices may degrade UL system performance. For example, while deployment of high-power class wireless devices within a radio range of ANs designed for low-power wireless devices enhances throughput of high-power class wireless devices, it degrades the UL link budget for low-power wireless devices operating within the same radio range due, in part, to overlooked power differences between high-power class wireless devices and the low-power wireless devices.

Overview

Exemplary embodiments described herein include systems, methods, and processing nodes for controlling an uplink transmission power of wireless devices on a wireless network. Controlling the uplink transmission power includes dynamically activating and deactivating a high-power transmission mode or changing a power class of the wireless devices in response to changes in a network topology, such as presence or absence of different types of access nodes, and signal level measurements of reference signals transmitted from said different types of access nodes. Such dynamic control of the uplink transmission power in real time minimizes interference that may potentially be caused to uplink transmissions of other wireless devices in the network, and mitigates unnecessary power consumption for wireless devices capable of utilizing the high-power mode.

An exemplary method for controlling a transmit power of a wireless device includes determining that a first signal level of a neighboring access node as measured by a wireless device attached to a serving access node meets a first signal level threshold, and disabling a high-power transmission mode of the wireless device. The high-power transmission mode enables the wireless device to transmit uplink data using a transmission power that is higher than a standard transmission power.

An exemplary system for controlling transmit power of a wireless device includes a first access node having a first coverage area, a second access node having a second coverage area that overlaps with the first coverage area, and a processing node communicatively coupled to the first access node. The processing node is configured to perform operations including receiving a first plurality of measurement reports performed by a corresponding plurality of wireless devices attached to the first access node, each of the first plurality of measurement reports indicating that a first signal level of the first access node meets a first signal level threshold. In response to receiving the first plurality of measurement reports, the processing node instructs each of the plurality of wireless devices to perform measurements of a second signal level of the second access node, receives a second plurality of measurement reports from a subset of the plurality of wireless devices, each of the second plurality of measurement reports indicating that the second signal level meets a second signal level threshold, determines that a number of wireless devices in the subset meets a threshold number of wireless devices, and switches an uplink power class of each of the plurality of wireless devices from a high uplink power class to a low uplink power class.

An exemplary wireless device for controlling a transmit power comprises a memory, a processor, and a transceiver, wherein the memory stores instructions that are executed by the processor to enable the wireless device to perform operations including receiving, from a serving access node, an identifier of the serving access node, wherein the identifier indicates that the serving access node is associated with a small-cell access node, and configuring the transceiver to switch from operating in a high-power transmission mode to operating in a standard-power transmission mode.

DETAILED DESCRIPTION

Figure 1:
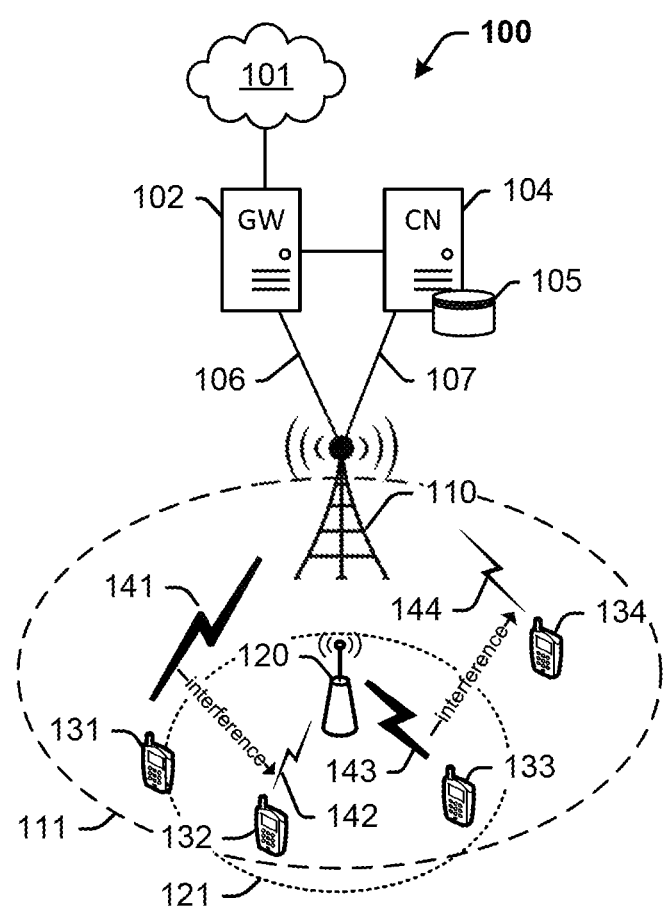
FIG. 1 depicts an exemplary system for controlling a transmit power of a wireless device.

Exemplary embodiments described herein include systems, methods, and processing nodes for controlling an uplink transmission power of wireless devices on a wireless network. Controlling the uplink transmission power includes dynamically activating and deactivating a high-power transmission mode of the wireless devices in response to changes in a network topology, such as presence or absence of different types of access nodes, and signal level measurements of reference signals transmitted from said different types of access nodes. Such dynamic control of the uplink transmission power in real time minimizes interference that may be caused to uplink transmissions of other wireless devices in the network, and mitigates unnecessary power consumption for wireless devices capable of utilizing the high-power mode.

Certain operations described herein may be performed by a wireless device. For example, when a wireless device attaches to an access node (hereinafter, "serving access node"), the wireless device may receive an identifier of the serving access node. The identifier may be a unique identifier, such as a Public Land Mobile Network (PLMN) identifier that indicates that the serving access node is a small-cell access node. For example, a network operator may assign a new unique PLMN to small-cell access nodes (such as femtocells, home eNodeBs, etc.) that are increasingly being deployed in the wireless network. Wireless devices attached to such small-cell access nodes need not operate using a high-power uplink transmission mode. Moreover, operating in the high-power mode can potentially cause interference to other wireless devices attached to the small-cell access node or to other neighboring access nodes, as described above. Therefore, upon detecting a PLMN (or other identifier) associated with small-cell access nodes, wireless devices may be configured to disable the high-power uplink transmission mode.

Activation and deactivation of the high-power transmission mode may further be based on signal level measurements of the serving access node and/or neighboring access nodes. The signal level measurements may include a power measurement of a reference signal received at a wireless device, such as a reference signal receive power (RSRP). In an exemplary embodiment, a wireless device is located near a cell edge of a serving access node, and therefore may be engaged in the high-power uplink transmission mode. Meanwhile, a signal level measurement of a neighboring access node may be performed at the wireless device. If the signal level of the neighboring access node is above a predefined threshold signal level, then the wireless device is configured to disable the high-power uplink transmission mode. This is based on the assumption that the neighboring access node is a suitable candidate for handover and, thus, the high-power transmission mode is not required. This is especially relevant when the serving access node and the neighboring access node deploy resources using the same frequency band or sub-band that is accessible by the wireless device. If the signal level of the neighboring access node does not meet the threshold, the high-power transmission mode is not disabled, or becomes enabled. Signal level measurements may be performed periodically to ensure that the uplink transmission power level is adjusted in real-time.

Certain operations described herein may be performed by a processing module located within the wireless network, such as within an access node. For example, a serving access node may instruct the wireless device to perform the signal level measurement of neighboring access nodes. The instruction to perform the signal level measurement of a neighboring access node may be triggered upon determining that a signal level of the serving access node is determined to meet (or decrease below) a signal level threshold. For example, a wireless device attached to the serving access node may periodically report signal level measurements of a reference signal of the serving access node, or may report a signal level measurement that is below the signal level threshold. Upon receiving this report, the serving access node instructs the wireless device to measure a signal level of a neighboring access node. The serving access node may identify specific neighboring access nodes based on known network topography, by referring to a controller node, or a locally-stored neighbor relations table (that is, in turn, updated by the controller node or other network node). If the signal level of the neighboring access node meets or exceeds a high threshold, then the high-power transmission mode is disabled for the wireless device. The wireless device may be instructed to periodically submit measurement reports. If a subsequent measurement report indicates that the signal level of the neighboring access node does not meet the high threshold, then the high-power transmission mode may be reactivated or enabled.

Disabling and enabling the high-power transmission mode may include changing a power class of the wireless device. For example, whereas standard wireless devices are allowed a maximum uplink transmit power as specified by a network operator, wireless devices capable of transmitting at a higher uplink transmit power (i.e. HPUEs) may be provided with a higher maximum uplink transmit power. Such variations in power may be defined using one of four power classes further described below. Changing the power class can include setting a maximum uplink transmission power value allowed by the serving access node to be equal to a standard maximum uplink transmission power value, and broadcasting the maximum uplink transmission power value to the wireless device.

In exemplary embodiments, a threshold number of wireless devices is monitored to determine how to control the transmit power of wireless devices attached to the serving access node. For example, the wireless device may be one of a plurality of wireless devices attached to the serving access node and capable of the high-power transmission mode. The serving access node (or processing module communicatively coupled thereto) is configured to receive measurement reports of neighboring access nodes as measured by one or more (i.e. a subset) of the plurality of wireless devices. The measurement reports may indicate that a signal level of the neighboring access node meets or exceeds a signal level threshold. Thus, upon determining that a number of wireless devices in the subset meets a threshold number of wireless devices, the serving access node may disable the high-power transmission mode for the wireless devices within the subset.

Alternatively or in addition, the serving access node may disable the high-power transmission mode for all wireless devices connected thereto by, for instance, broadcasting an updated maximum transmit power value within a system information message to all wireless devices. In addition, the instruction to perform signal measurements of neighboring access nodes may be triggered by receiving measurement reports of the serving access node's reference signal measured by the plurality of wireless devices, and determining that the signal level is below another signal level threshold. In other words, if a threshold number of wireless devices indicate a low signal level of the serving access node and a high signal level of a neighboring access node, then the high-power transmission mode is disabled. The high-power transmission mode may be disabled by switching a power class of the wireless devices, broadcasting a lower maximum power value, etc. Moreover, the high-power transmission mode may be enabled upon subsequently receiving measurement reports. Such subsequent measurement reports may be based on an instruction to periodically perform the measurements at the wireless devices. If the number of wireless devices that submit subsequent measurement reports indicating that a high signal level of the neighboring access node and low signal level of the serving access node falls below the threshold number of wireless devices, then the serving access node can enable (or stop disabling) the high-power transmission mode for the plurality of wireless devices.

The operations disclosed herein may be performed by one or more of a wireless device, a serving access node, a controller node, or any other network node, alone or in any combination, as further described below with respect to the embodiments depicted in FIGS. 1-11.

FIG. 1 depicts an exemplary system 100 for controlling a transmit power of a wireless device. System 100 comprises a communication network 101, gateway node 102, controller node 104, access nodes 110 and 120, and wireless devices 131, 132, 133, 134. Access node 110 is illustrated as having a coverage area 111, and access node 120 is illustrated as having a coverage area 121, with coverage areas 111 and 121 being illustrated as overlapping with each other. Further, wireless devices 131 and 134 are illustrated as being in direct communication with access node 110 over communication links 141 and 144, respectively, and wireless devices 132 and 133 are illustrated as being in direct communication with access node 120 over communication links 142 and 143, respectively. It should be noted that although only access nodes 110, 120 and wireless devices 131, 132, 133, 134 are shown in FIG. 1, any number and combination of access nodes and wireless devices is possible within system 100, without any material difference to the operations described herein.

At least wireless devices 131 and 133 may be capable of operating in a high-powered transmission mode. As described herein (and further with respect to FIG. 3), such wireless devices are able to communicate with access nodes over longer distances than standard wireless devices. In other words, an effective coverage area of an access node may be increased to effectively reach wireless devices at a cell edge. For example, wireless device 131 is located at a cell edge of coverage area 111, and therefore enables a high-powered transmission mode for uplink transmission via communication link 141. Similarly, wireless device 133 may have enabled a high-powered transmission mode for uplink transmission to access node 120 via communication link 143. Alternatively or in addition, wireless devices 131, 133 may be assigned a transmit power class that allows a higher transmit power than either of wireless devices 132, 134. Regardless of the reasons why high-powered transmissions are enabled for either of wireless devices 131, 133, it will be appreciated by those having ordinary skill in the art that these high-powered transmissions can cause interference to wireless devices 132, 134 operating using a standard transmission power for uplink transmissions, particularly when each of wireless devices 131, 132, 133, 134 utilize the same frequency band or sub-band.

Certain operations described herein may be performed by a wireless device. For example, when a wireless device attaches to an access node (hereinafter, "serving access node"), the wireless device may receive an identifier of the serving access node. The identifier may be a unique identifier, such as a Public Land Mobile Network (PLMN) identifier that indicates that the serving access node is a small-cell access node. For example, a network operator may assign a new unique PLMN to small-cell access nodes (such as femtocells, home eNodeBs, etc.) that are increasingly being deployed in the wireless network. Wireless devices attached to such small-cell access nodes need not operate using a high-power uplink transmission mode. Moreover, operating in the high-power mode can cause interference to other wireless devices attached to the small-cell access node or to other neighboring access nodes, as described above. Therefore, upon detecting a PLMN (or other identifier) associated with small-cell access nodes, wireless devices may be configured to disable the high-power uplink transmission mode.

Consequently, the high-power transmission mode may be deactivated or disabled on one or more of wireless devices 131, 133. The determination to disable the high-power transmission mode may be based on signal level measurements of serving access node 110 and/or neighboring access node 120. For example, wireless device 131 may perform a signal level measurement of neighboring access node 120. The signal level measurement may include a power measurement of a reference signal transmitted by access node 120 and received at wireless device 131, such as a reference signal receive power (RSRP). If the signal level of access node 120 is above a predefined threshold signal level, then wireless device 131 is configured to disable the high-power uplink transmission mode. This is based on the assumption that access node 120 is a suitable candidate for handover, particularly when the serving access node and the neighboring access node deploy resources using the same frequency band or sub-band. Thus, the high-power transmission mode is not required. If the signal level of access node 120 does not meet the threshold, the high-power transmission mode is not disabled, or becomes enabled. Signal level measurements may be performed periodically to ensure that the uplink transmission power level is adjusted in real-time.

Serving access node 110 may instruct wireless device 131 to perform the signal level measurement of access node 120. The instruction to perform the signal level measurement of access node 120 may be triggered upon determining that a signal level of serving access node 110 measured at wireless device 131 meets or decreases below a low signal level threshold. For example, wireless device 131 may be configured to periodically report signal level measurements of another reference signal transmitted by serving access node 110. Alternatively or in addition, wireless device 131 may be configured to report only those signal level measurements that are below the low signal level threshold. Upon receiving such measurement reports, serving access node 110 instructs wireless device 131 to measure a signal level of access node 120, or any other neighboring access node. Serving access node 110 may identify specific neighboring access nodes based on known network topography, by referring to a database 105 coupled to controller node 104, or a locally-stored neighbor relations table (that is, in turn, updated by controller node 104 or other network node). If the signal level of the neighboring access node (or access node 120) meets or exceeds a high threshold, then the high-power transmission mode is disabled for wireless device 131. If a subsequent measurement report indicates that the signal level of access node 120 does not meet the high threshold, then the high-power transmission mode may be reactivated or enabled.

In another example, a high-power transmission mode of wireless device 133 may be enabled or disabled based on signal level measurements of one or both of access node 120 (in this case, the serving access node) and access node 110 (in this case, the neighboring access node). The signal level measurement may include a power measurement of a reference signal transmitted by access node 110 and received at wireless device 133, such as a reference signal receive power (RSRP). If the signal level of access node 110 is above a predefined threshold signal level, then wireless device 133 is configured to disable the high-power uplink transmission mode. This is based on the assumption that access node 110 is a suitable candidate for handover and, thus, the high-power transmission mode is not required. If the signal level of access node 110 does not meet the threshold, the high-power transmission mode is not disabled, or becomes enabled. Signal level measurements may be performed periodically to ensure that the uplink transmission power level is adjusted in real-time.

Access node 120 may instruct wireless device 133 to perform the signal level measurement of access node 110. The instruction to perform the signal level measurement of access node 110 may be triggered upon determining that a signal level of access node 120 measured at wireless device 133 meets or decreases below a low signal level threshold. For example, wireless device 133 may be configured to periodically report signal level measurements of another reference signal transmitted by serving access node 120. Alternatively or in addition, wireless device 133 may be configured to report only those signal level measurements that are below the low signal level threshold. Upon receiving such measurement reports, access node 120 instructs wireless device 133 to measure a signal level of access node 110, or any other neighboring access node. If the signal level of access node 110 meets or exceeds a high threshold, then the high-power transmission mode is disabled for wireless device 133. If a subsequent measurement report indicates that the signal level of access node 110 does not meet the high threshold, then the high-power transmission mode may be reactivated or enabled.

Disabling and enabling the high-power transmission mode may include changing a power class of wireless devices 131, 133. For example, whereas standard wireless devices are allowed a maximum uplink transmit power as specified by a network operator, wireless devices capable of transmitting at a higher uplink transmit power, such as wireless devices 131, 133, may be provided with a higher maximum uplink transmit power. Such variations in power may be defined using one of four power classes further described below. Changing the power class can include setting a maximum uplink transmission power value allowed by a serving access node to be equal to a standard maximum uplink transmission power value, and broadcasting the maximum uplink transmission power value to each wireless device.

Alternatively or in addition, dynamic control of power levels may be performed by wireless devices 131, 133 based on any combination of an identifier of an access node or signal level measurements thereof. For example, when wireless device 133 attaches to access node 120, wireless device 133 may receive an identifier of access node 120. The identifier may be a unique identifier, such as a Public Land Mobile Network (PLMN) identifier that indicates that access node 120 is a small-cell access node. For example, a network operator may assign a new unique PLMN to small-cell access nodes (such as femtocells, home eNodeBs, etc.) that are increasingly being deployed in system 100. Wireless devices attached to such small-cell access nodes need not operate using a high-power uplink transmission mode. Moreover, operating in the high-power mode can cause interference to other wireless devices attached to the small-cell access node or to other neighboring access nodes, as described above. Therefore, upon detecting a PLMN (or other identifier) associated with access node 120, wireless device 133 may be configured to disable the high-power uplink transmission mode. Further, either of wireless devices 131, 133 may be configured to dynamically control their transmission power level based on the signal level measurements of one or both of access nodes 110, 120, as described above.

Access nodes 110, 120 can be any network node configured to provide communication between wireless devices 131-134 and communication network 101, including standard access nodes and/or short range, low power, small access nodes. For instance, access node 110 may include any standard access node, such as a macro-cell access node, base transceiver station, a radio base station, an eNodeB device, an enhanced eNodeB device, or the like. In an exemplary embodiment, a macro-cell access node can have a coverage area 111 in the range of approximately five kilometers to thirty-five kilometers and an output power in the tens of watts. In an embodiment, access node 120 can be a small-cell access node including a microcell access node, a pico-cell access node, a femtocell access node, or the like such as a home NodeB or a home eNodeB device.

Figure 2:
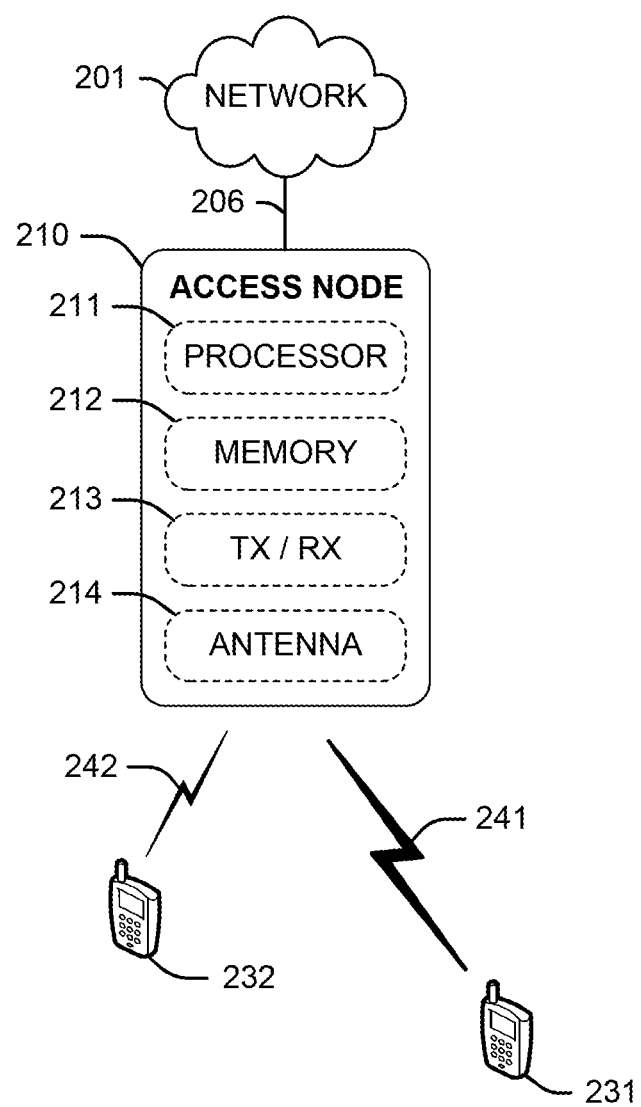
FIG. 2 depicts an exemplary access node for controlling a transmit power of a wireless device.

Access nodes 110, 120 can comprise a processor and associated circuitry to execute or direct the execution of computer-readable instructions to perform operations such as those further described in FIG. 2. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can each receive instructions and other input at a user interface. Access nodes 110, 120 communicates with gateway node 102 and controller node 104 via communication links 106, 107. Access nodes 110, 120 may communicate with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Each of wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible. Components of exemplary wireless device and transmission power capabilities thereof are further described with reference to FIG. 3.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as location and power class assignments of wireless devices 131-134, presence and identifiers of access nodes 110, 120, maximum transmit power allowances thereof, and so on.

This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

FIG. 2 depicts an exemplary access node 210 for controlling a transmit power of a wireless device. Access node 210 may comprise, for example, a macro-cell access node such as access node 110 described with reference to FIG. 1, or a small-cell access node such as access node 120, and provides wireless devices 231, 232 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 231, 232 over communication links 241, 242, respectively. Instructions stored on memory 212 can include instructions for scheduling resources and/or determining transmit powers for communication links 241, 242 associated respectively with wireless devices 231, 232, as further described herein and with respect to FIGS. 4-8.

Figure 3:
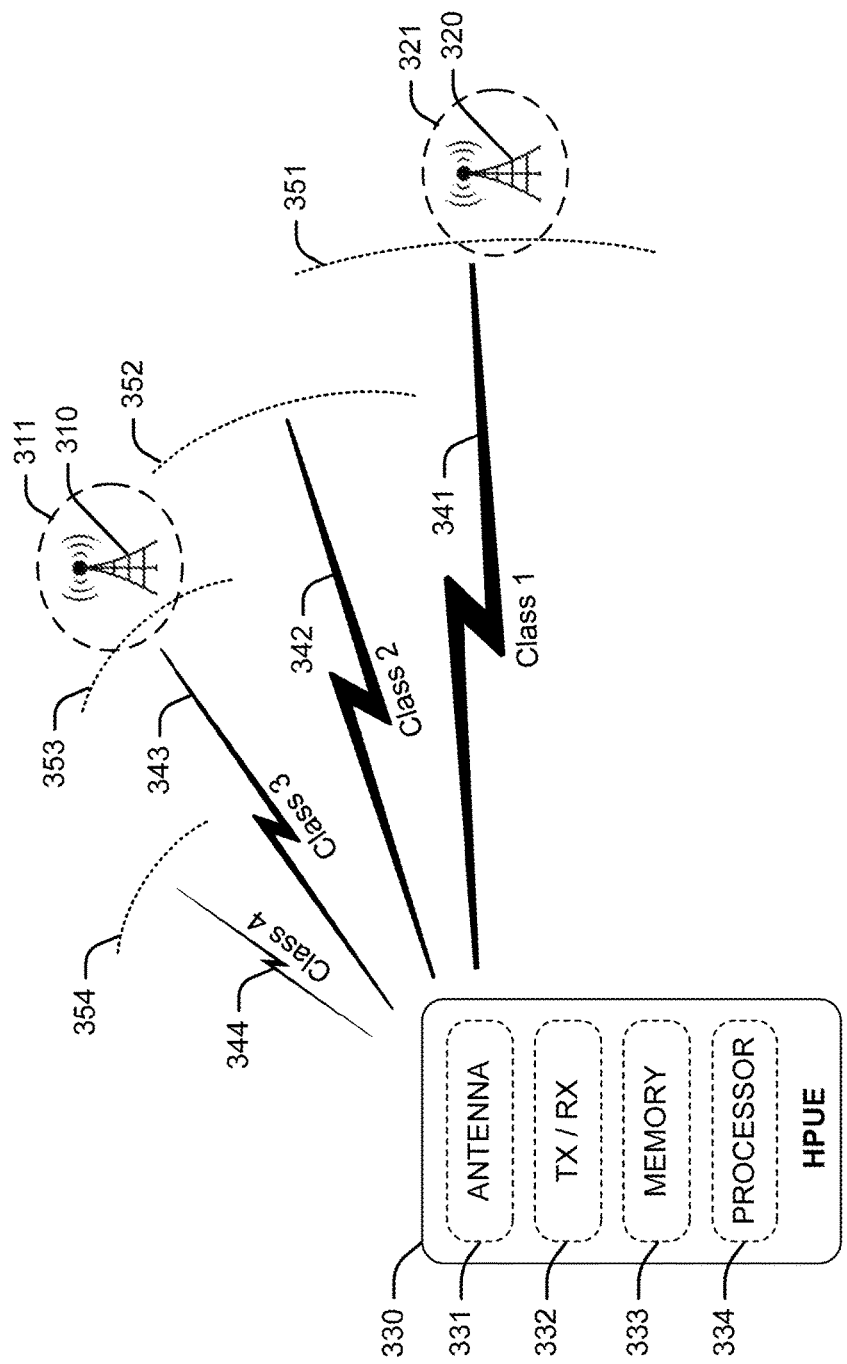
FIG. 3 depicts an exemplary wireless device capable of transmission in several power classes.

FIG. 3 depicts an exemplary wireless device 330 capable of transmission in several power classes. As noted above, wireless devices can be configured as different power class wireless devices (e.g., high-power wireless devices and/or standard-power wireless devices as well as low-power wireless devices). Wireless device 330 is therefore equipped with an appropriate antenna 331 and transceiver 332 enabling increased transmit power from wireless device 330 to one or more access node 310, 320. For example, wireless device 330 is capable of operating in a transmission mode utilizing power class 1, to transmit an uplink transmission 341 at a range 351. Wireless device 330 may further switch transmission modes to utilizing power class 2 to transmit uplink transmission 342 at a range 352, utilizing power class 3 to transmit uplink transmission 343 at a range 353, and utilizing power class 4 to transmit uplink transmission 344 at a range 354. Antenna 331 and transceiver 332 are appropriately configured to utilize these differently-powered transmission modes.

Further, an effective coverage area of an access node can be limited by an amount of power available to a wireless device, enabling wireless devices capable of utilizing high-power transmission modes to communicate with access nodes from a longer distance than standard-power wireless devices. In this embodiment, coverage areas 311, 321 of access nodes 310, 320 (as also depicted in FIG. 1) can vary based on the transmission mode being utilized by wireless device 330. In other words, effective coverage areas 351-354 can change dynamically based on a transmit power level of uplink transmissions 341, 342, 343, 344. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 330 may be configured to transmit uplink transmissions 341 utilizing a high-power transmission mode such as power class 1. Alternatively, to enable communication with access node 310 from a short distance, wireless device 330 may be configured to transmit uplink transmissions 341 utilizing a standard-power transmission mode such as power class 3. Moreover, controlling the transmit power level or changing the power class of wireless devices can be performed by setting a maximum uplink transmission power value allowed by the serving access node to be equal to a standard maximum uplink transmission power value, and broadcasting the maximum uplink transmission power value to the wireless device via, for example, a system information message.

Figure 4:
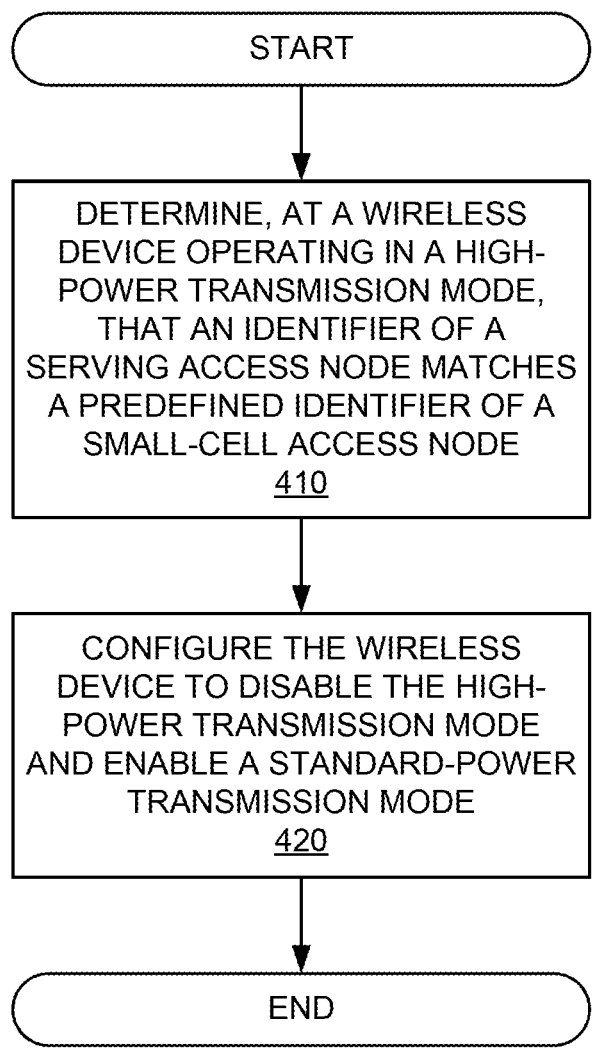
FIG. 4 depicts an exemplary method for controlling a transmit power of a wireless device based on an access node identifier.

FIG. 4 depicts an exemplary method for controlling a transmit power of a wireless device based on an access node identifier. The method of FIG. 4 may be implemented by an access node such as access node 110, 120, 210, by a wireless device such as wireless device 131, 133, 330, by a controller node such as controller node 104, or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a unique identifier of the serving access node, such as a PLMN identifier, may indicate that the serving access node is a small-cell access node. For example, a network operator may assign a new unique PLMN to small-cell access nodes (such as femtocells, home eNodeBs, etc.) that are increasingly being deployed in the wireless network. Wireless devices attached to such small-cell access nodes need not operate using a high-power uplink transmission mode. Moreover, operating in the high-power mode can cause interference to other wireless devices attached to the small-cell access node or to other neighboring access nodes, as described above. Therefore, at 420, upon detecting a PLMN (or other identifier) associated with small-cell access nodes, a wireless device may be configured to disable the high-power uplink transmission mode. Disabling the high-power uplink transmission mode may comprise lowering a power class of the wireless device, or reconfiguring a transceiver and/or antenna of the wireless device to transmit using a lower power level.

Figure 5:
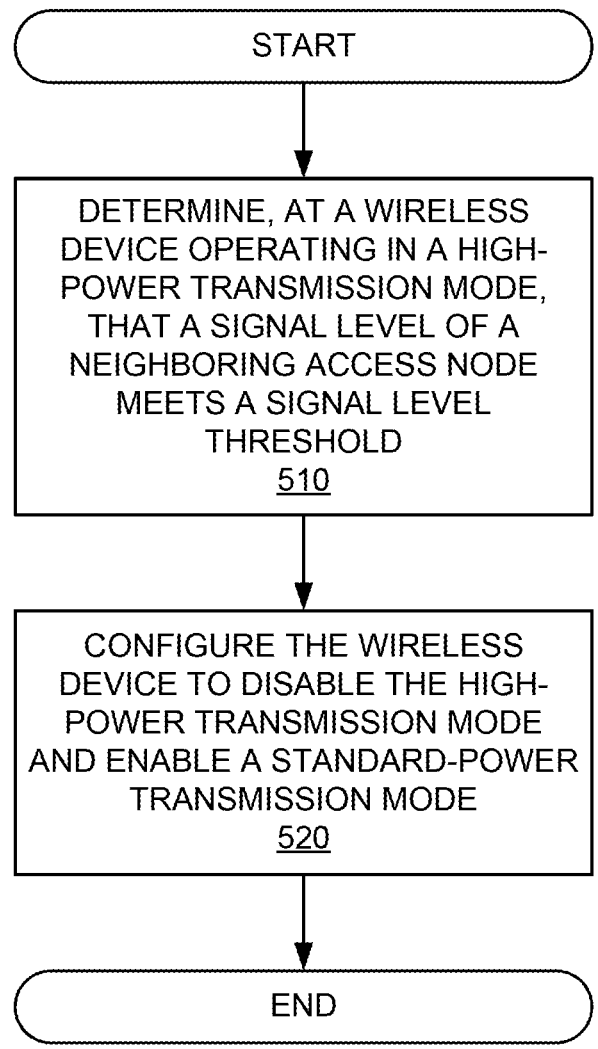
FIG. 5 depicts another exemplary method for controlling a transmit power of a wireless device based on a signal level measurement of a neighboring access node.

Activation and deactivation of the high-power transmission mode may further be based on signal level measurements of the serving access node and/or neighboring access nodes, as further described with reference to FIGS. 5 and 6. For example, FIG. 5 depicts an exemplary method for controlling a transmit power of a wireless device based on a signal level measurement of a neighboring access node. The method of FIG. 5 may be implemented by an access node such as access node 110, 120, 210, by a wireless device such as wireless device 131, 133, 330, by a controller node such as controller node 104, or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a signal level measurement performed by a wireless device may include a power measurement of a reference signal (such as, for instance, an RSRP) received at the wireless device from a nearby or neighboring access node. For example, the wireless device may be located near a cell edge of a serving access node, and therefore may be engaged in the high-power uplink transmission mode. Meanwhile, a signal level measurement of a neighboring access node may be performed at the wireless device. If the signal level of the neighboring access node is above a predefined threshold signal level, then, at 520, the wireless device is configured to disable the high-power uplink transmission mode, and enable a standard-power (or low-power) transmission mode. Such an adjustment is based on the assumption that, should signals from the serving access node become too faint, the neighboring access node is a suitable candidate for handover, particularly when the serving access node and the neighboring access node deploy resources using the same frequency band or sub-band. Thus, the high-power transmission mode would not be required. If the signal level of the neighboring access node does not meet the threshold, the high-power transmission mode is not disabled, or becomes enabled.

Figure 6:
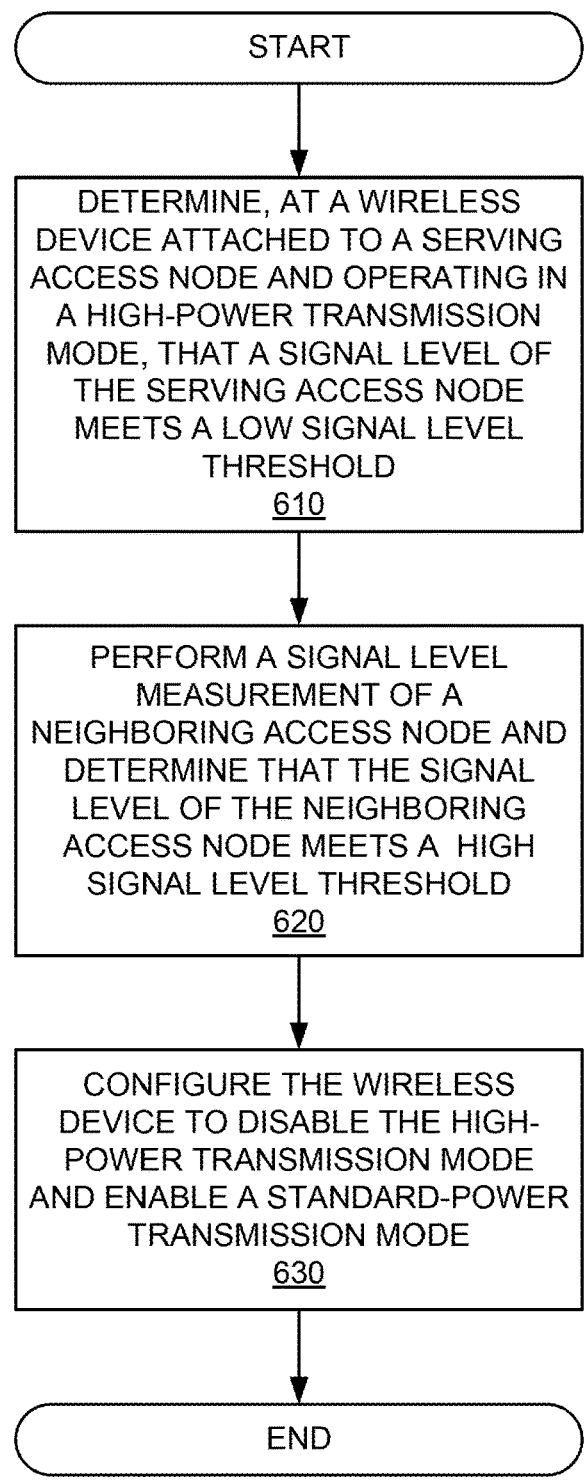
FIG. 6 depicts another exemplary method for controlling a transmit power of a wireless device based on signal level measurements of a serving access node and a neighboring access node.

FIG. 6 depicts another exemplary method for controlling a transmit power of a wireless device based on signal level measurements of a serving access node and a neighboring access node. The method of FIG. 6 may be implemented by an access node such as access node 110, 120, 210, by a wireless device such as wireless device 131, 133, 330, by a controller node such as controller node 104, or by any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a signal level measurement performed by a wireless device may include a power measurement of a reference signal (such as, for instance, an RSRP) received at the wireless device from a serving access node. For example, the wireless device may be configured to periodically scan and report signal level measurements of a serving access node while being attached to said serving access node. Alternatively or in addition, the wireless device may be configured to report a signal level measurement that is below a signal level threshold. In response to determining the low signal level of the serving access node, a measurement of a neighboring access node may be triggered at 620. For example, upon receiving a report that a signal level of the serving access node is determined to meet (or decrease below) a signal level threshold, the serving access node may instruct the wireless device to measure a signal level of one or more neighboring access node. The serving access node may identify specific neighboring access nodes based on known network topography, by referring to a controller node, or a locally-stored neighbor relations table (that is, in turn, updated by the controller node or other network node). Alternatively or in addition, the wireless device may be configured to measure signal levels of nearby access nodes based on available signal levels determined by a real-time scanning operation.

Further at 620, a signal level of a nearby or neighboring access node may be determined to be above a threshold signal level, either by the wireless device, or based on a report submitted to a serving access node. Subsequently, at 630, the wireless device is configured to disable the high-power uplink transmission mode, and enable a standard-power (or low-power) transmission mode. Such an adjustment is based on the assumption that, should signals from the serving access node become too faint, the neighboring access node is a suitable candidate for handover, particularly when the serving access node and the neighboring access node deploy resources using the same frequency band or sub-band. Thus, the high-power transmission mode would not be required. If the signal level of the neighboring access node does not meet the threshold, the high-power transmission mode is not disabled, or becomes enabled.

Figure 7:
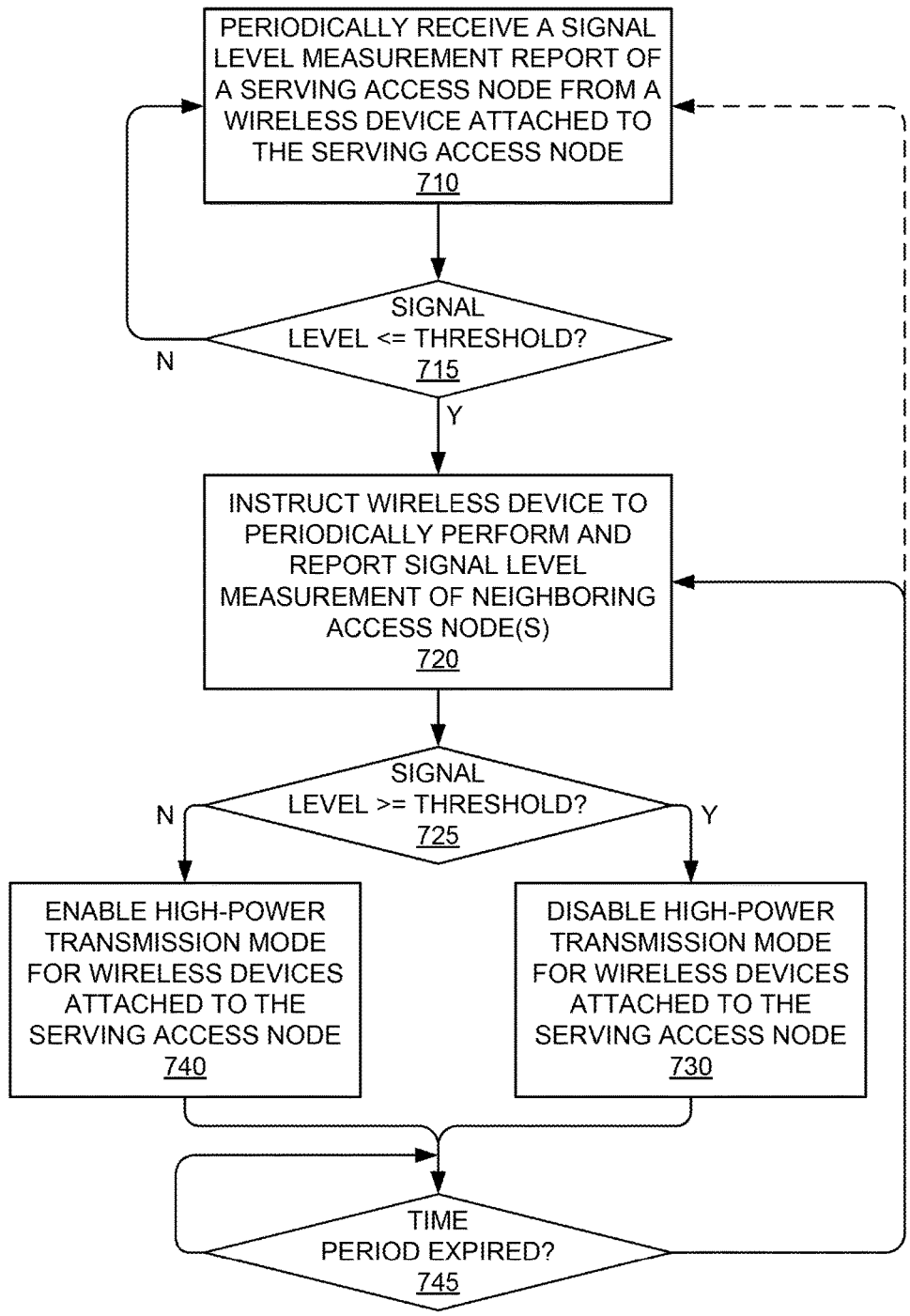
FIG. 7 depicts another exemplary method for controlling a transmit power of a wireless device based on signal level measurements.

As described herein, dynamic and real-time power class adjustments can be enabled by repeated or periodic measurement reports from wireless devices attached to a serving access node. FIG. 7 depicts an exemplary method for controlling a transmit power of a wireless device based on periodic signal level measurements. The method of FIG. 7 may be implemented by an access node such as access node 110, 120, 210, by a controller node such as controller node 104, or by any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, periodic signal level measurements of a serving access node are received at the serving access node or other network node. For example, a wireless device attached to the serving access node may periodically report signal level measurements of a reference signal of the serving access node. At 715, the signal level of the serving access node is compared with a signal level threshold in order to determine whether it meets or falls below a signal level threshold. In either case, if the signal level does not meet or fall below the signal level threshold, nothing happens, and the method loops back to 710 for the next periodic measurement report. However, if the signal level of the serving access node (as measured by the wireless device) meets or falls below the threshold then, at 720, the serving access node instructs the wireless device to periodically perform signal level measurements of one or more neighboring access nodes. The serving access node may identify specific neighboring access nodes based on known network topography, by referring to a controller node, or a locally-stored neighbor relations table (that is, in turn, updated by the controller node or other network node). The serving access node therefore receives periodic measurement reports of signal levels (such as, for instance, RSRP) of said one or more neighboring access nodes as measured by the wireless device.

At 725, signal levels received in reports are compared with a threshold. If the signal level of the neighboring access node meets or exceeds the threshold then, at 730, the high-power transmission mode is disabled for the wireless device. However, if the signal level does not meet or exceed the threshold at 725, then at 740 the high-power transmission mode may be reactivated or enabled. Disabling and enabling the high-power transmission mode may include changing a power class of the wireless device. Changing the power class can include setting a maximum uplink transmission power value allowed by the serving access node to be equal to a standard maximum uplink transmission power value, and broadcasting the maximum uplink transmission power value to the wireless device. Further, at 745, a timer expiration is monitored, and the method eventually loops back to either step 720 for subsequent/repeated neighbor access node measurements, or optionally to 710 for subsequent/repeated serving access node measurements.

Figure 8:
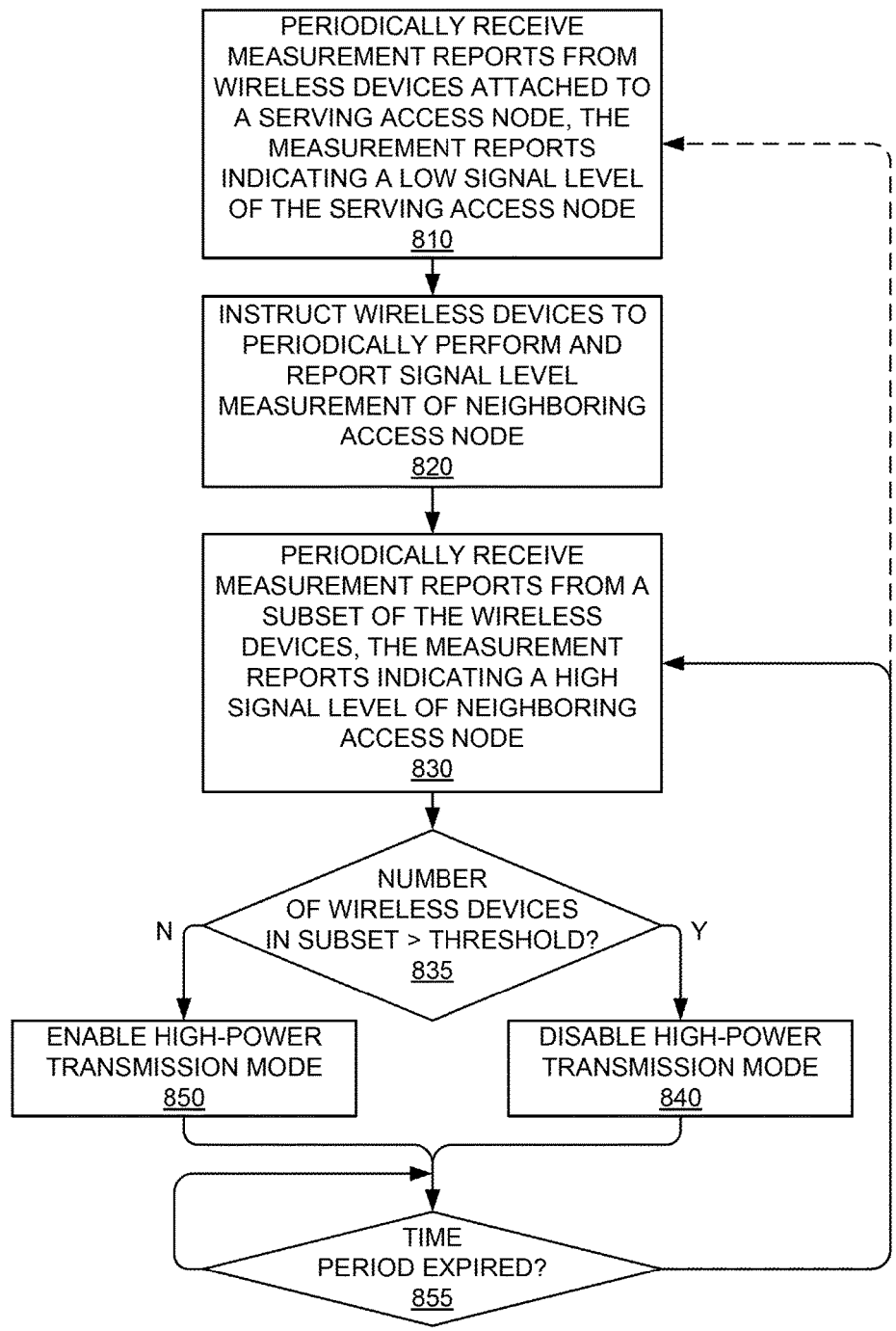
FIG. 8 depicts another exemplary method for controlling a transmit power of a plurality of wireless devices based on repeated signal level measurements from a threshold number of wireless devices.

In exemplary embodiments depicted below in FIGS. 8-10, a threshold number of wireless devices is monitored to determine how to control the transmit power of wireless devices attached to the serving access node. FIG. 8 depicts an exemplary method for controlling a transmit power of a plurality of wireless devices based on repeated signal level measurements from a threshold number of wireless devices. The method of FIG. 8 may be implemented by an access node such as access node 110, 120, 210, by a controller node such as controller node 104, or by any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, periodic signal level measurements of a serving access node are received at the serving access node or other network node indicating a low signal level of the serving access node as measured at a wireless device. For example, a plurality of wireless devices may be attached to the serving access node and capable of the high-power transmission mode. These wireless devices may periodically report signal level measurements of a reference signal of the serving access node, which are determined to meets or fall below a signal level threshold. Receiving such reports at 810 may trigger the serving access node to instruct wireless devices attached thereto to periodically perform signal level measurements of one or more neighboring access nodes. Alternatively or in addition, a threshold number of measurement reports (or measurement reports from a threshold number of wireless devices) may be received prior to triggering the measurement of neighboring access node at 810. In either case, the serving access node may identify specific neighboring access nodes based on known network topography, by referring to a controller node, or a locally-stored neighbor relations table (that is, in turn, updated by the controller node or other network node).

Consequently, at 830, the serving access node receives periodic measurement reports of signal levels (such as, for instance, RSRP) of said one or more neighboring access nodes as measured by a portion or subset of the wireless devices that indicate a high signal level of the neighboring access node. For example, from all the wireless devices indicating a low signal level of the serving access node at 810 and therefore instructed to measure neighboring signal levels at 820, a subset of the wireless devices may measure a high signal level of a neighboring access node. A signal level of one or more neighboring access nodes may be measured at each wireless device in the subset, and determined to be greater than a second threshold signal level (either by the wireless device or by the serving access node based on the received measurement reports). Then, at 835, a number of wireless devices in the subset is compared against a threshold number of wireless devices. If the number meets or exceeds the threshold, the high-power transmission mode is disabled. In other words, upon determining that a number of wireless devices in the subset meets a threshold number of wireless devices, the serving access node may disable the high-power transmission mode for the wireless devices within the subset. Disabling and enabling the high-power transmission mode may include changing a power class of the wireless device. Alternatively or in addition, the serving access node may disable the high-power transmission mode for all wireless devices connected thereto by, for instance, broadcasting an updated maximum transmit power value within a system information message to all wireless devices.

If the number does not meet or exceed the threshold, then at 850 a standard or low-power transmission mode is maintained or activated. In other words, if the number of wireless devices that submit subsequent measurement reports indicating that a high signal level of the neighboring access node and low signal level of the serving access node falls below the threshold number of wireless devices, then the serving access node can enable (or stop disabling) the high-power transmission mode for the plurality of wireless devices. The threshold may be selected or determined based on a potential level of interference caused by the wireless devices operating in high-power mode. In other words, if the number of wireless devices operating in the high-power mode would cause an undesirable amount of interference to uplink signals from other wireless devices operating in a low-power mode, then the high-power mode of said high-power wireless devices is disabled at 840. Further, at 855, a timer expiration is monitored, and the method eventually loops back to either step 830 for subsequent/repeated neighbor access node measurements, or optionally to 810 for subsequent/repeated serving access node measurements.

The method of FIG. 8 may be applied to different network configurations as depicted in FIGS. 9 and 10. For example FIG. 9 depicts an exemplary system 900 for controlling a transmit power of a plurality of wireless devices attached to a macro-cell access node 910 and adjacent to neighboring small-cell access node 920. Access nodes 910 and 920 may be considered equivalent to access nodes 110, 120 in system 100. Other network elements may be present in system 900 to facilitate communication but are omitted for clarity, such as controllers, gateways, and physical and/or wireless data links for carrying data among the various network elements. System 900 depicts a plurality of wireless devices 931, 932, 933, 934 attached to serving access node 910 and capable of the high-power transmission mode. Wireless devices 931-934 may be considered equivalent to wireless devices 131, 133 in system 100.

Figure 9A:
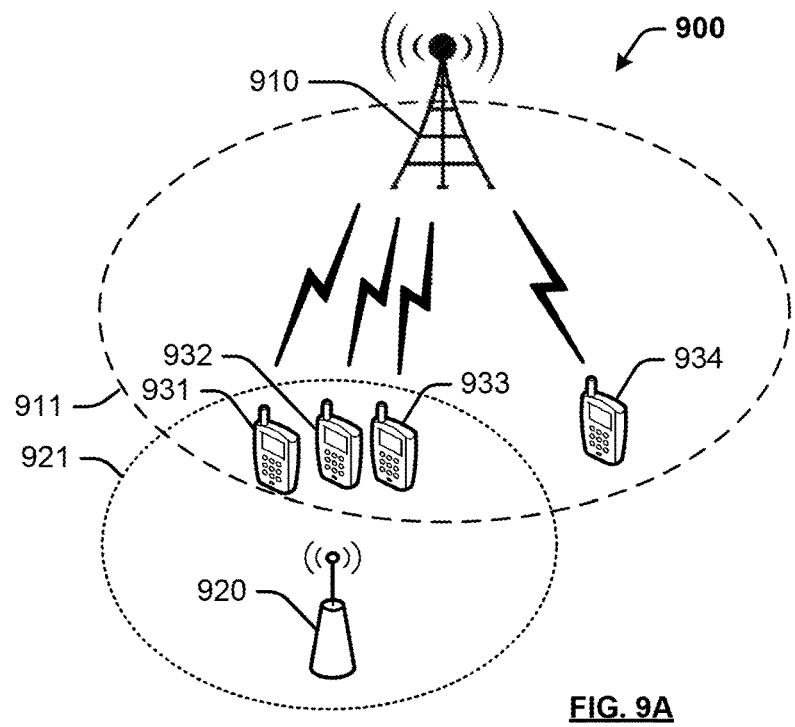
FIGS. 9A-9B depict an exemplary system for controlling a transmit power of a plurality of wireless devices attached to a macro-cell access node.

Further, with reference to FIG. 9A, a portion of wireless devices 931-934 (i.e. wireless devices 931, 932, 933) are illustrated as being within a coverage area 921 of access node 920, while wireless device 934 is illustrated as being outside coverage area 921. Thus, only said portion of wireless devices 931-933 measures a high signal level for access node 920, and reports said measurement back to access node 910. Whereas, wireless device 934 either submits a measurement showing a low signal level for access node 920, or is unable to generate said measurement report. As discussed with reference to FIG. 8, a threshold number of measurement reports (or measurement reports from a threshold number of wireless devices) may be required to disable the high-power transmission mode. In this instance, the threshold may be said to 4 wireless devices or measurement reports. Thus, the high-power transmission mode is maintained. The threshold may be selected or determined based on a potential level of interference caused by the wireless devices operating in high-power mode. In other words, if the number of wireless devices operating in the high-power mode would not cause an undesirable amount of interference to uplink signals from other wireless devices operating in a low-power mode (not shown), then the high-power mode of said high-power wireless devices would be maintained.

Figure 9B:
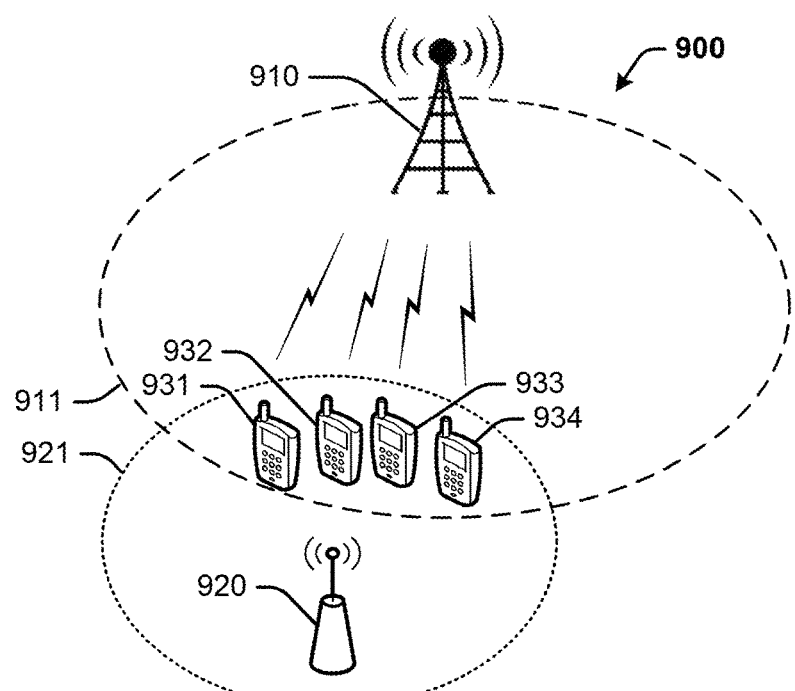

With reference to FIG. 9B, wireless device 934 is illustrated as being within coverage area 921. Thus, the subset of wireless devices that can report a high signal level measurement for access node 920 is increased to 4. As described above, wireless devices 931-934 may periodically or repeatedly submit measurement reports to serving access node 910. In this case, it would be determined that the threshold number of measurement reports is received (or measurement reports received from a threshold number of wireless devices), and the high-power transmission mode is disabled. In other words, if the number of wireless devices operating in the high-power mode would cause an undesirable amount of interference to uplink signals from other wireless devices operating in a low-power mode (not shown), then the high-power mode of said high-power wireless devices would be disabled. Disabling and enabling the high-power transmission mode may include changing a power class of wireless devices 931-934. Alternatively or in addition, serving access node 910 may disable the high-power transmission mode for all wireless devices connected thereto (including any wireless devices not shown in system 900) by, for instance, broadcasting an updated maximum transmit power value within a system information message to all wireless devices.

Figure 10A:
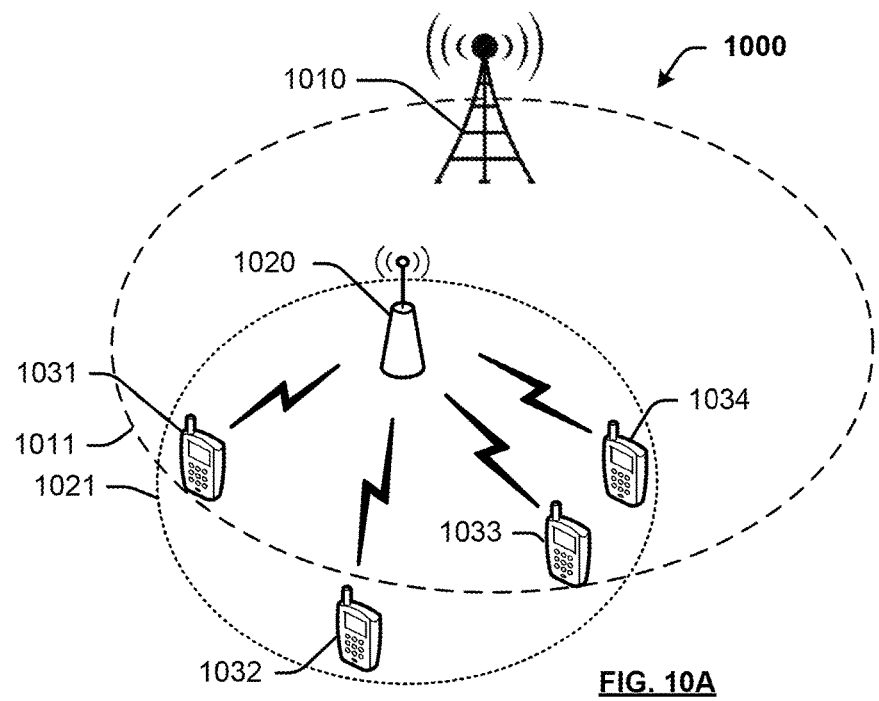
FIGS. 10A-10B depict an exemplary system for controlling a transmit power of a plurality of wireless devices attached to a small-cell access node.
Figure 10B:
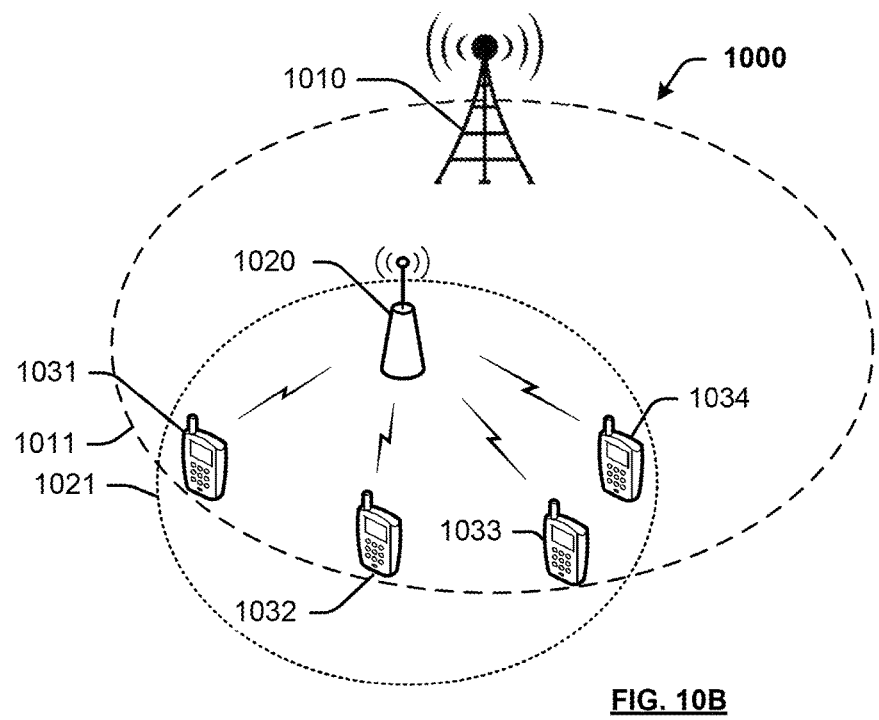

FIGS. 10A-10B depict an exemplary system 1000 for controlling a transmit power of a plurality of wireless devices attached to a small-cell access node 1020 and adjacent to neighboring macro-cell access node 1010. Access nodes 1010 and 1020 may be considered equivalent to access nodes 110, 120 in system 100, or access nodes 910 and 920 in system 900. Other network elements may be present in system 1000 to facilitate communication but are omitted for clarity, such as controllers, gateways, and physical and/or wireless data links for carrying data among the various network elements. System 1000 depicts a plurality of wireless devices 1031, 1032, 1033, 1034 attached to small access node 1020 (i.e. the serving access node) and capable of the high-power transmission mode. Wireless devices 1031-1034 may be considered equivalent to wireless devices 131, 133 in system 100.

Further, with reference to FIG. 10A, a portion of wireless devices 1031-1034 (i.e. wireless devices 1031, 1033, 1034) are illustrated as being within a coverage area 1011 of access node 1010 (i.e. the neighboring access node), while wireless device 1032 is illustrated as being outside coverage area 1011. Thus, only said portion of wireless devices 1031, 1033, 1034 measures a high signal level for access node 1010, and reports said measurement back to access node 1020. Whereas, wireless device 1032 either submits a measurement showing a low signal level for access node 1010, or is unable to generate said measurement report. As discussed with reference to FIG. 8, a threshold number of measurement reports (or measurement reports from a threshold number of wireless devices) may be required to disable the high-power transmission mode. In this instance, the threshold may be said to 4 wireless devices or measurement reports. Thus, the high-power transmission mode is maintained.

However, with reference to FIG. 10B, wireless device 1032 is illustrated as being within coverage area 1011. Thus, the subset of wireless devices that can report a high signal level measurement for access node 1010 is increased to 4. As described above, wireless devices 1031-1034 may periodically or repeatedly submit measurement reports to serving access node 1020. In this case, it would be determined that the threshold number of measurement reports is received (or measurement reports received from a threshold number of wireless devices), and the high-power transmission mode is disabled. Disabling and enabling the high-power transmission mode may include changing a power class of wireless devices 1031-1034. Alternatively or in addition, serving access node 1020 may disable the high-power transmission mode for all wireless devices connected thereto (including any wireless devices not shown in system 1000) by, for instance, broadcasting an updated maximum transmit power value within a system information message to all wireless devices.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, wireless devices 131, 132, 133, 134, controller node 104, and/or network 101.

Figure 11:
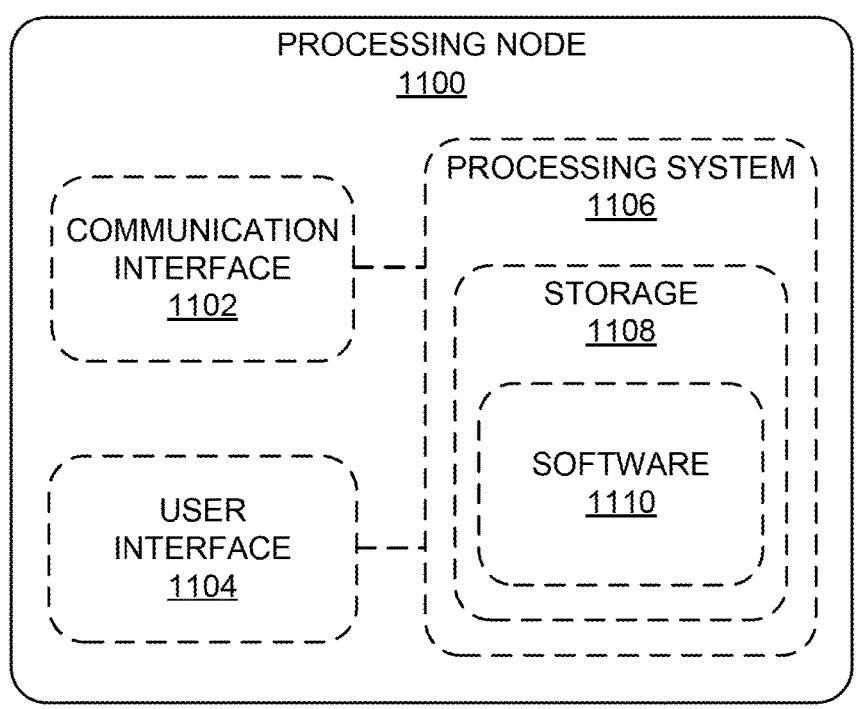
FIG. 11 depicts an exemplary processing node for controlling a transmit power of wireless devices in a wireless network.

FIG. 11 depicts an exemplary processing node for controlling a transmit power of wireless devices in a wireless network. Processing node 1100 comprises a communication interface 1102, user interface 1104, and processing system 1106 in communication with communication interface 1102 and user interface 1104. Processing system 1106 includes storage 1108, which can comprise a disk drive, flash drive, memory circuitry, or other memory device. Storage 1108 can store software 1110 which is used in the operation of the processing node 1100. Storage 1108 may include a disk drive, flash drive, data storage circuitry, or some other memory apparatus. For example, storage 1108 may include a buffer. Software 1110 may include computer programs, firmware, or some other form of machine-readable instructions, including an operating system, utilities, drivers, network interfaces, applications, or some other type of software. For example, software 1110 may include a module for performing transmit power control operations described herein. Processing system 1106 may include a microprocessor and other circuitry to retrieve and execute software 1110 from storage 1108. Processing node 1100 may further include other components such as a power management unit, a control interface unit, etc., which are omitted for clarity. Communication interface 1102 permits processing node 1100 to communicate with other network elements. User interface 1104 permits the configuration and control of the operation of processing node 1100.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for controlling a transmit power of a wireless device, the method comprising:
   receiving, at a serving access node, a first signal level of a neighboring access node as measured by a wireless device attached to the serving access node:
   determining, by the serving access node, that the first signal level meets a first signal level threshold; and
   disabling, by the serving access node, a high-power transmission mode of the wireless device,
   wherein disabling the high-power transmission mode comprises one or both of: lowering a maximum uplink transmission power value allowed by the serving access node, or lowering a power class of the wireless device, and
   wherein the high-power transmission mode enables the wireless device to transmit uplink data using a transmission power that is higher than a standard transmission power;
   receiving a measurement of a second signal level of the serving access node from the wireless device;
   determining that the second signal level meets a second signal level threshold;
   triggering a measurement of the first signal level of the neighboring access node; and
   receiving the measurement of the first signal level, prior to determining that the first signal level meets the first signal level threshold.

2. The method of claim 1, wherein triggering the measurement of the second signal level comprises instructing the wireless device to periodically repeat the measurement of the second signal level.

3. The method of claim 2, further comprising:
   determining, based on a repeated measurement, that the second signal level does not meet the second signal level threshold; and
   enabling the high-power transmission mode on the wireless device.

4. The method of claim 2, wherein the wireless device is one of a plurality of wireless devices attached to the serving access node and capable of the high-power transmission mode, the method further comprising:
   receiving, from a first subset of the plurality of wireless devices, measurement reports indicating that the second signal level meets the second signal level threshold;
   determining that a number of wireless devices in the first subset meets a threshold number of wireless devices; and
   disabling the high-power transmission mode for the plurality of wireless devices.

5. The method of claim 4, further comprising:
   subsequently receiving, from a second subset of the plurality of wireless devices, measurement reports indicating that the second signal level meets the second signal level threshold;
   determining that a number of wireless devices in the second subset does not meet the threshold number of wireless devices; and
   enabling the high-power transmission mode for the plurality of wireless devices.

6. The method of claim 1, wherein disabling the high-power transmission mode of the wireless device further comprises:
   broadcasting the lowered maximum uplink transmission power value to the wireless device.

7. A system for controlling transmit power of a wireless device, the system comprising:
   a first access node having a first coverage area;
   a second access node having a second coverage area that overlaps with the first coverage area; and
   a processing node communicatively coupled to the first access node, the processing node being configured to perform operations comprising:
   responsive to receiving a first plurality of measurement reports performed by a corresponding plurality of wireless devices attached to the first access node, each of the first plurality of measurement reports indicating that a first signal level of the first access node meets a first signal level threshold, instructing each of the plurality of wireless devices to perform measurements of a second signal level of the second access node;
   receiving a second plurality of measurement reports from a subset of the plurality of wireless devices, each of the second plurality of measurement reports indicating that the second signal level meets a second signal level threshold;
   determining that a number of wireless devices in the subset meets a threshold number of wireless devices; and
   switching an uplink power class of each of the plurality of wireless devices from a high uplink power class to a low uplink power class.

8. The system of claim 7, wherein the first signal level comprises a signal level of a first reference signal transmitted from the first access node and measured at each of the plurality of wireless devices.

9. The system of claim 8, wherein the second signal level comprises a signal level of a second reference signal transmitted from the second access node and measured at each of the subset of the plurality of wireless devices.

10. The system of claim 7, wherein the operations further comprise:
    determining, at a subsequent time, that the number of wireless devices in the subset does not meet the threshold number of wireless devices; and
    switching the uplink power class of each of the plurality of wireless devices from the low uplink power class to the high uplink power class.

11. The system of claim 7, wherein:
    the first access node is a small-cell access node, and
    the second access node is a macro-cell access node.

12. The system of claim 11, wherein the threshold number of wireless devices is defined based on a potential interference caused by the plurality of wireless devices attached to the small-cell access node and transmitting using the high uplink power class.

13. A serving access node for controlling a transmit power of a wireless device, the serving access node comprising a processor that is configured to perform operations comprising:
- receiving a first signal level of a neighboring access node as measured by a wireless device attached to the serving access node;
- determining that the first signal level meets a first signal level threshold; and disabling a high-power transmission mode of the wireless device,
- wherein disabling the high-power transmission mode comprises one or both of: lowering a maximum uplink transmission power value allowed by the serving access node, or lowering a power class of the wireless device, and
- wherein the high-power transmission mode enables the wireless device to transmit uplink data using a transmission power that is higher than a standard transmission power;
- receiving a measurement of a second signal level of the serving access node from the wireless device;
- determining that the second signal level meets a second signal level threshold;
- triggering a measurement of the first signal level of the neighboring access node; and
- receiving the measurement of the first signal level, prior to determining that the first signal level meets the first signal level threshold.

14. The serving access node of claim 13, wherein triggering the measurement of the second signal level comprises instructing the wireless device to periodically repeat the measurement of the second signal level.

15. The serving access node of claim 14, wherein the operations further comprise:
- determining, based on a repeated measurement, that the second signal level does not meet the second signal level threshold; and
- enabling the high-power transmission mode on the wireless device.

* * * * *